United States Patent [19]
Hirschi

[11] 4,024,468  
[45] May 17, 1977

[54] INDUCTION BALANCE METAL DETECTOR WITH INVERSE DISCRIMINATION

[75] Inventor: Richard Edward Hirschi, Sweet Home, Oreg.

[73] Assignee: White's Electronics, Inc., Sweet Home, Oreg.

[22] Filed: June 18, 1975

[21] Appl. No.: 587,844

[52] U.S. Cl. .................................. 324/3; 324/6; 324/41

[51] Int. Cl.² ..................................... G01V 3/10

[58] Field of Search ................... 324/3, 41, 6

[56] References Cited

UNITED STATES PATENTS

| | | | |
|---|---|---|---|
| 2,744,232 | 5/1956 | Shawhan et al. | 324/3 |
| 3,020,470 | 2/1962 | Shawhan et al. | 324/3 |
| 3,052,837 | 9/1962 | Arbogast et al. | 324/3 |
| 3,065,407 | 11/1962 | Huddleston et al. | 324/6 |
| 3,094,658 | 6/1963 | Bravenec et al. | 324/6 |
| 3,112,443 | 11/1963 | Buckner | 324/6 |
| 3,471,772 | 10/1969 | Smith | 324/3 |
| 3,471,773 | 10/1969 | Penland | 324/3 |
| 3,551,795 | 12/1970 | Bock et al. | 324/3 |
| 3,742,341 | 6/1973 | Clowes et al. | 324/3 |
| 3,826,973 | 7/1974 | Pflaum | 324/3 |
| 3,835,371 | 9/1974 | Mirdadian et al. | 324/3 |
| 3,872,380 | 3/1975 | Gardiner | 324/3 |
| 3,896,371 | 7/1975 | Hametta | 324/3 |

*Primary Examiner*—Gerald R. Strecker  
*Attorney, Agent, or Firm*—Klarquist, Sparkman, Campbell, Leigh, Hall & Whinston

[57] ABSTRACT

An induction balance metal detector is described which is capable of discriminating between different types of metal objects, such as bottle caps and coins, by amplitude discrimination of their corresponding receive signals. In addition, the detector is provided with a tuning control which is used to eliminate the effect of ferrous mineral soil on the output signal of the receive coil. The discriminate control changes the phase of the residual output signal of the receive coil to set the quiescent operating point of the metal detector to a selected angle between about zero and −90° relative to the component of the receive coil signal produced by the presence of magnetic mineral soil, and the tuning control adjusts the amplitude of the residual signal to an audio threshold level. As a result, the desired coins or other high conductivity metal objects reduce the amplitude of the received signal below the audio threshold level so that they tend to produce no sound output or a negative indication while all other objects increase the amplitude of such signal above the audio threshold level so they tend to produce a sound output. This inverse discrimination is provided with a positive indication by means of a comparator having one input connected to an audio pulse generator synchronized to the oscillator and its other input connected to the demodulated audio frequency output of the receive coil. The comparator compares the amplitude of the input signals and produces a positive indication signal an audio output only when the received signal is less than the amplitude of the standard audio pulses. The detector may be provided with a transmit coil whose annular loop shaped windings are provided with a re-entrant portion forming a feedback coil so that current flows in opposite directions through such transmit coil and feedback coil.

15 Claims, 7 Drawing Figures

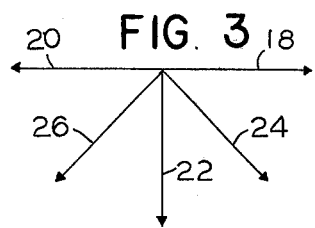
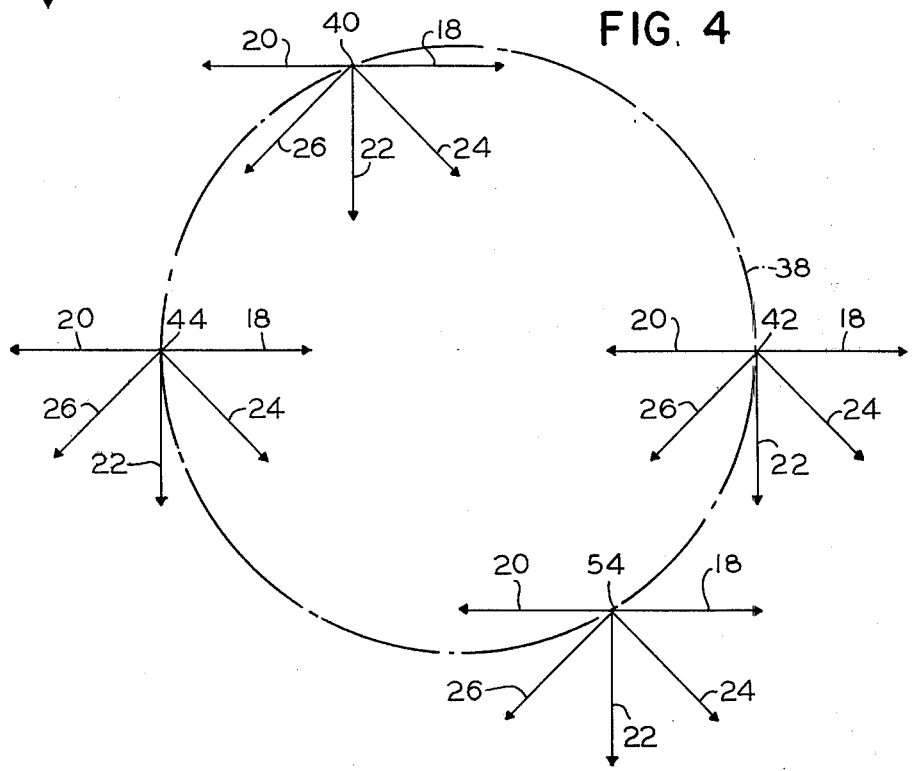
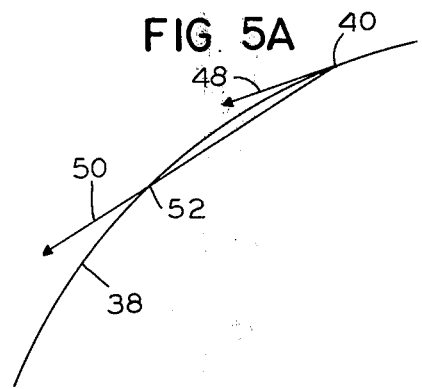
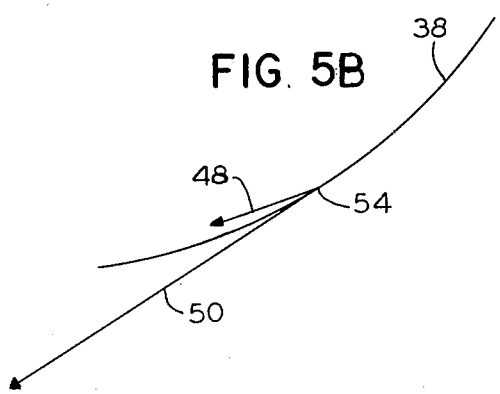

INDUCTION BALANCE METAL DETECTOR WITH INVERSE DISCRIMINATION

BACKGROUND OF THE INVENTION

The subject matter of the present invention relates generally to metal detectors, and in particular to induction balance type metal detectors having the ability to discriminate between different types of metal objects. The metal detector of the present invention is of great sensitivity and is especially useful in finding coins and other small metal objects buried in the ground or located in water and other inaccessible places.

Induction balance metal detectors have been provided with a means for discriminating between ferrous mineral soil and a metal object, as discussed on pages 93 to 96 of THE ELECTRONIC METAL DETECTOR HANDBOOK, by E. S. LeGaye, published in 1969 by Western Heritage Press of Houston, Texas. However, previously such induction balance metal detectors have not been provided with amplitude discrimination between different types of metal objects, such as valuable coins and worthless bottle caps or can pull tabs. The metal detector of the present invention is capable of discriminating between different types of metal objects having phase angles between about −90° and −180° relative to the received signal component produced by magnetic mineral soil, and in addition avoids false readings by employing inverse discrimination. Inverse discrimination as hereafter discussed refers to the fact that in the present circuit, coins and other highly conductive targets which are sought to be detected reduce the amplitude of the received coil signal below its normal "audio threshold" level while all other targets increase the amplitude of such received signal above the audio threshold level. Such inverse discrimination would ordinarily provide an undesirable negative indication of the coins by causing the detector to produce no sound or other audio output indication when the coins are detected. This problem is avoided by providing the detector with an amplitude comparator having one input connected to the demodulated output of the receive coil and another input connected to an audio pulse generator synchronized to the audio modulation of the R. F. oscillator signal so that the comparator produces an audio output signal only when the received signal is of less amplitude than the audio pulse. As a result, the no sound negative indication of a target is converted into a sound output positive indication of such target.

Another induction balance metal detector referred to as a phase readout gradiometer is shown on page 62 of the August 1974 issue of Western Treasures magazine, which employs a phase comparator for comparing the phase of the received output signal of the receiver coil with the phase of the oscillator signal connected to the transmit coil and displays the relative phase angle of the received signal on a meter. Thus the output of the phase comparator is an output pulse whose width varies with the phase of the received signal and whose amplitude apparently remains substantially constant. Unlike the inverse discriminator detector of the present invention, it does not employ a voltage comparator to compare the amplitude of the received signal with the amplitude of reference pulses to produce an audio output signal only when the received signal amplitude is less than that of such standard pulses. In addition, the phase readings provided on the meter of this instrument are unreliable in ferrous mineral soil because it shifts the phase of the received signal. The detector of the present invention avoids these problems as hereafter discussed.

Ferrous mineral soil changes the amplitude of the residual signal produced in the receive coil when no target is present, and may detune the detector so that it is no longer at the audio threshold level. As a result the sensitivity of the detector is decreased making it difficult to detect metal objects. Ferrous mineral soil also changes the phase of the residual signal produced in the receive coil when no metal target is present, and may therefore affect the discrimination capability of the detector so that certain metal objects produce a receive coil amplitude response which is positive at times but negative at other times depending on the amplitude of the mineral soil component of the receive coil output signal. These problems caused by mineral soil are overcome in the detector circuit of the present invention by using a tuning control which adjusts the amplitude of the residual receive coil signal along an axis having the same phase angle as the signal produced by the ferrous mineral soil. In addition, a trimmer capacitor is connected between the transmit coil and the receive coil so that it can also be used to adjust the amplitude of the residual receive coil signal produced when no metal object is present. As a result, the effect of ferrous mineral soil can be completely eliminated by adjustment of the trimmer capacitor and the tuning control so that the residual signal at the output of the receive coil is maintained at the audio threshold level and at the correct phase angle regardless of the type of soil encountered.

SUMMARY OF INVENTION

It is therefore one object of the present invention to provide an induction balance metal detector capable of receive coil amplitude discrimination between different types of metal objects having phase angles between about −90° and −180° relative to the received signal component produced by magnetic mineral soil.

An additional object of the invention is to provide such a metal detector including a tuning control for eliminating the effect of ferrous mineral soil on the received signal.

Another object of the invention is to provide such a metal detector employing inverse discrimination whereby detection of desired metal objects decreases the amplitude of the received signal below the audio threshold level which tends to produce an output indication of no sound, while the detection of other objects increases the amplitude of such received signal over such threshold level which tends to produce a sound output.

A further object of the invention is to provide such a metal detector in which these output indications are reversed so that reduction of the amplitude of the received signal below the audio threshold level is converted into a positive indication of the presence of the desired metal object by a signal amplitude comparator to produce a sound or other input indication.

Still another object of the invention is to provide an induction balance metal detector with a discriminator means to change the phase of the residual output signal of the receive coil to an angle between about zero and −90° relative to the received signal component produced by magnetic mineral soil, and a tuning means which adjusts the amplitude of the residual signal to the audio threshold level in order to provide the metal detector with an operating point which enables inverse discrimination.

A still further object of the invention is to provide such a metal detector of improved sensitivity which employs transmit and receive coils of shapes and relative positions which provide a more uniform detection field and improved discrimination capability.

BRIEF DESCRIPTION OF DRAWINGS

Other objects and advantages of the present invention will be apparent from the following detailed description of a preferred embodiment thereof and from the attached drawings of which:

FIG. 3 is a phasor diagram of different signals produced by the receive coil in the metal detector of FIG. 1 by different targets;

FIG. 4 is a phasor diagram showing different operating points on the circle representing the audio threshold level of the metal detector of FIG. 1;

FIGS. 5A and 5B are phasor diagrams showing different operating points using normal discrimination and inverse discrimination;

DESCRIPTION OF PREFERRED EMBODIMENT

Figure 1:
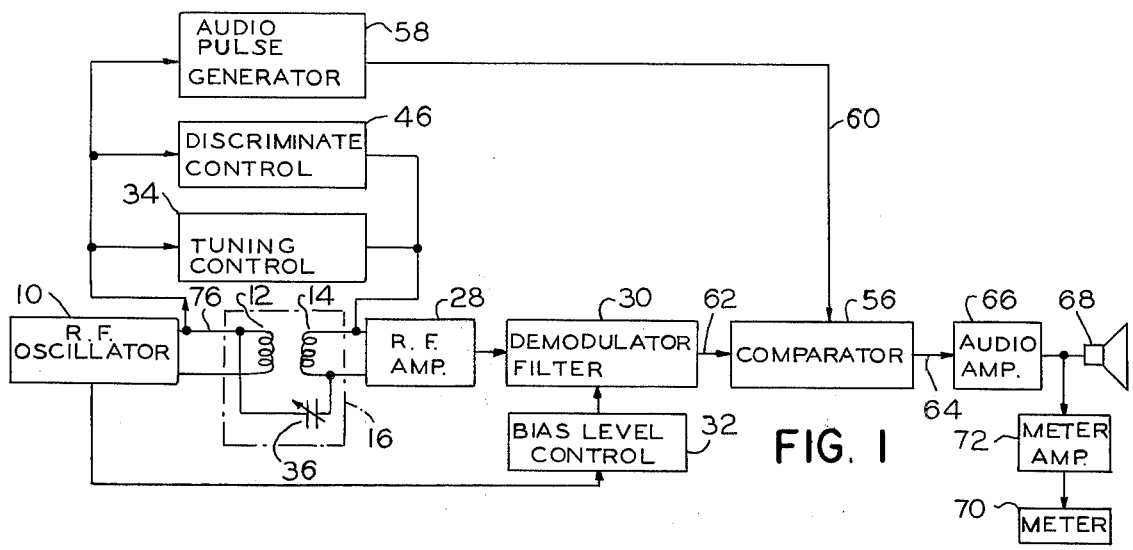
FIG. 1 is a block diagram of the electrical system of one embodiment of the induction balance metal detector of the present invention.

As shown in FIG. 1, one embodiment of the induction balance metal detector of the present invention includes a radio frequency oscillator 10 of approximately 100 kilohertz (KHz) frequency whose sine wave output signal is amplitude modulated at an audio frequency. The output of the oscillator 10 is conducted to a transmit coil 12 which is supported adjacent a receive coil 14 within a detector search head 16. The transmit coil 12 includes a negative feedback loop as more clearly shown in FIG. 7, so that the inductive fields of the transmit coil and the feedback loop balance one another and produce substantially no output signal in the receive coil 14 in air when no metal object or ferrous mineral is present. For this reason the detector is referred to as an induction balance metal detector.

Upon receipt of the modulated R. F. signal, the transmit coil 12 acts as an antenna to produce an electromagnetic detection field whose depth of penetration into the ground is determined by the frequency of the oscillator signal and the size of the coils in the search head 16. If a metal object is present in the field of the transmit coil antenna, it will distort the field pattern. Induction changes also occur but they are not an important factor in the operation of an induction balance detector. In addition, the metal object receiving the transmitted signal in effect rebroadcasts the signal as a second field produced by the eddy currents caused in the metal object by the first field. The receive coil 14 detects these changes and produces a received signal whose phase and amplitude depend on the type of metal object being detected and its distance from the search head 16.

As shown in FIG. 3, magnetic or ferrous mineral soil, such as that containing ferric oxide, produces a received signal across the receive coil 14 having a phasor 18 which has a phase angle of about zero degrees. Metal objects of high electrical conductivity containing non-magnetic metal, such as coins and precious metal including rings and other jewelry, produce a received signal having a phasor 20 which is shifted 180° from that of the mineral soil phasor 18. However, many magnetic metal objects of iron produce a received signal having a phasor 22 which is at a negativity phase angle of −90° from the mineral soil phasor 18. In addition, other iron targets, such as nails, may produce a phasor 24 which may be at an angle of approximately −45° with respect to the mineral soil phasor. Metal targets of low electrical conductivity, including tin foil, bottle caps, and can pull tabs produce a received signal having a phasor 26 with a phase angle between phasor 20 and 22 which for some of these objects may be about −135°. It should also be noted that the size and shape of the metal object as well as the type of metal in such object produces received signals of different phase angles. For example, it has been found with one embodiment of the present invention that nickel coins produce a phase angle of about −161°, while bottle caps produce a phase angle of −152°. In spite of this, it is possible to discriminate nickel coins from bottle caps using the inverse discrimination of the present invention, as will be hereafter discussed with respect to FIGS. 5A and 5B.

As shown in FIG. 1, the output of the receive coil 14 is transmitted through a radio frequency amplifier 28 to a demodulator 30 which may be a low frequency pass filter that removes the high frequency R. F. signal and transmits only the low frequency audio modulation of the received signal. A bias level control 32 is provided which automatically changes the D.C. voltage bias level of the demodulator 30 in accordance with changes in the amplitude level of the oscillator 10, from any cause, such as due to aging of the power supply batteries of such oscillator, or to the effects of temperature changes.

A tuning control 34 is connected between the upper side of the transmit coil 12 and the corresponding side of the receive coil 14, while a trimmer capacitor 36 is connected between the upper side of transmit coil 12 and the lower side of receive coil 14. Both the tuning control and the trimmer capacitor are set to provide a tuning signal of the same phase angle as the residual received signal produced by magnetic mineral soil, which cancels a portion of such received signal to change the amplitude of the residual received signal along an axis parallel to that of the mineral soil phasor 18. Because of the way the tuning control 34 is connected, it can be adjusted to increase or reduce the residual received signal amplitude. The combined action of the tuning control 34 and the trimmer capacitor 36 is to eliminate the effect of ferrous mineral soil on the received signal by in effect cancelling phasor 18 so that the residual received signal is provided with an amplitude equal to that of an audio threshold level shown by the circle 38 in FIG. 4.

The audio threshold level in an induction balance metal detector is the level of the received signal above which a sound output indication is normally produced by the detector and below which no sound output is normally produced. Thus, when using normal discrimination in an induction balance metal detector, if one were attempting to discriminate high conductivity, nonmagnetic metal targets represented by phasor 20, the detector would be operated at an operating point 40 on the audio threshold circle 38 of FIG. 4, which has a positive phase angle between about +90° and +135° relative to the zero phase of the reference phasor 18. Thus, at operating point 40, any received signal along phasor 20 exceeds the audio threshold level 38 and tends to produce a sound output indicating that a coin had been detected. However, any other metal object whose received signals are represented by phasors 22, 24, and 26 tend to reduce the amplitude of the received signal below the audio threshold level 38 and would not produce any sound output.

Conventional induction balance metal detectors are not capable of discriminating between different types of metal targets because they were operated at either of two operating points 42 or 44 respectively at zero degrees or 180° on the audio threshold circle 38. Some of these prior detectors shown in the book by LeGaye, referred to above, used a tuning control to eliminate the effect of mineral soil by changing from operating point 42 to operating point 44. At point 44 the mineral soil phasor 18 reduces the received signal below audio threshold 38 while the coin phasor 20 increases the received signal above such threshold. However, at operating point 44 phasors 22 and 26 also increase the amplitude of the received signal above the audio threshold level and there is no way of discriminating between these two phasors and the phasor 20 of the desired metal object. Thus, while the effect of the mineral soil phasor 18 and the iron object phasor 24 have been eliminated at operating point 44, discrimination between other different types of metal objects having phase angles between about −90° and −180° relative to phasor 18, is still not possible.

The metal detector of the present invention overcomes this problem by employing a discriminate control 46 which is connected between transmit coil 12 and the receive coil 14 for adjusting the operating points to different locations other than points 42 and 44 on the audio threshold level circle 38. One possible point at which normal discrimination between different types of metal targets may be achieved is operating point 40, as discussed above.

However, as shown in FIG. 5A, false readings can be obtained when using normal discrimination operating at point 40, which makes it difficult to discriminate between a nickel coin having a phasor 48 with a phase angle of about −161° and a bottle cap having a phasor 50 with a phase angle of about −152°. Thus, the bottle cap phasor 50 is usually of a larger amplitude than coin phasor 48 so that phasor 50 may exceed the audio threshold level 38 at crossover 52 and produce a false sound indication which the operator interprets as detection of a nickel coin. These false readings can be substantially eliminated by changing the operating point from point 40 to point 54 in FIG. 4, which is at a negative phase angle between about −90° and −45° with respect to the mineral soil phasor 18 and zero reference point 42. As a result, an inverse type of discrimination is achieved in which the phasor 20 of the coin or other high conductivity metal object reduces the received signal below the audio threshold level 38 while the phasors of all other metal objects increase the amplitude of the received signal above the audio threshold level.

As shown in FIG. 5B, this inverse discrimination operation at point 54 eliminates the false reading problem of the bottle cap phasor 50 because the phasor 48 of the nickel coin lies within the audio threshold level circle 38 while the bottle cap phasor 50 always lies outside of such threshold level circle. It should be noted that under one set of conditions the amplitude of the nickel coin phasor 48 may exceed the audio threshold level 38 even at operating point 54. This occurs when the search head 16 is directly over the nickel and at an extremely close distance to it, less than approximately one-half inch. However, this problem can be easily avoided by simply spacing the search coil slightly further from the surface of the ground. In any event, the nickel coin will produce a correct response before the search head approaches too near whereas a bottle cap can never produce a correct response.

Figure 2:
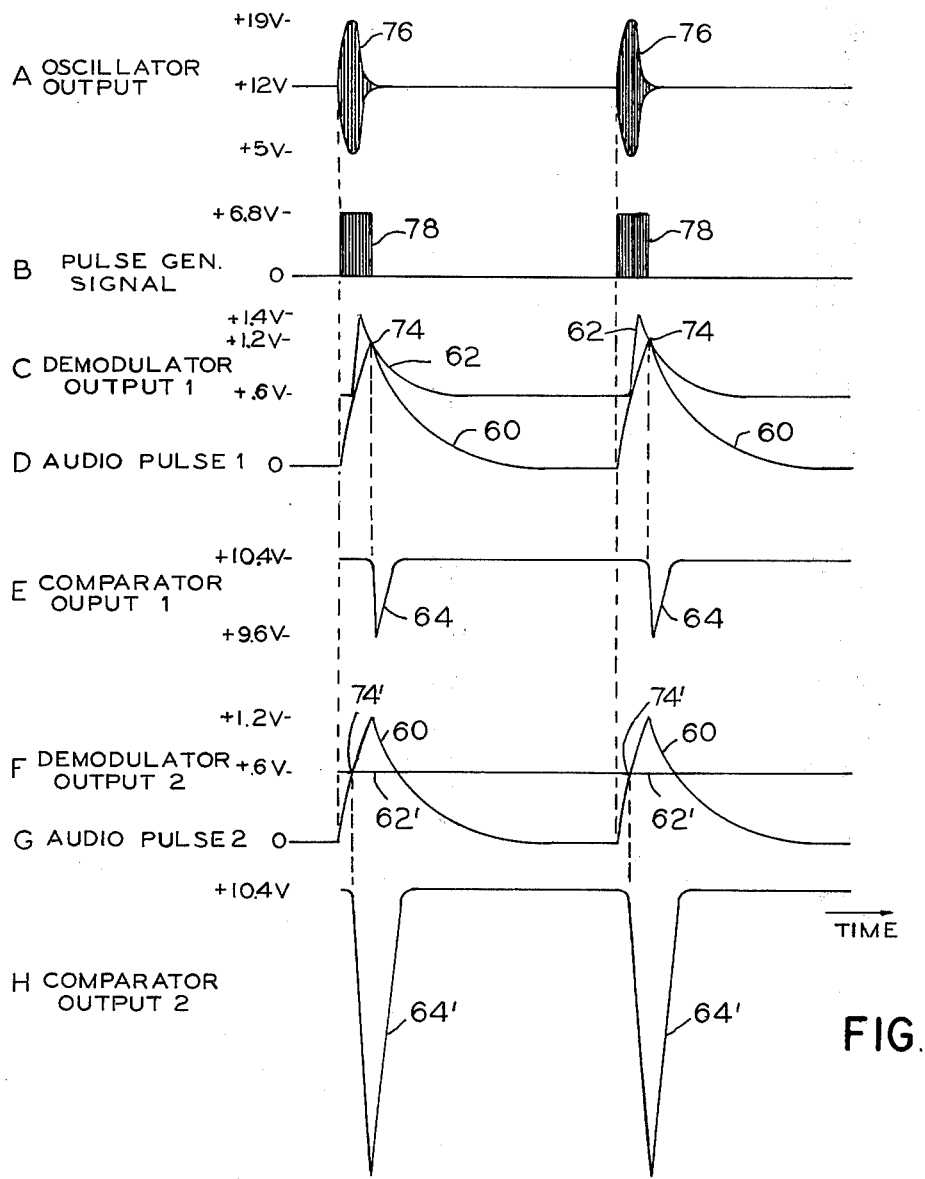
FIG. 2 shows the waveforms of electrical signals produced in the system of FIG. 1, such waveforms being in time relationship to one another.

There are many advantages to operating with inverse discrimination at operating point 54, including improved discrimination, greater sensitivity and reduced false indications. However, the lack of any sound output or other positive indication of the presence of the coin or other metal object represented by phasor 20 is undesirable because it is difficult for many detector operators to interpret. This is avoided in the circuit of FIG. 1 by providing a comparator 56 having one input connected to the output of the demodulator 30 to receive the demodulated received signal and having its other input connected to the output of an audio pulse generator 58 which is synchronized to the audio frequency of the output signal of oscillator 10. As shown in FIG. 2, the audio pulse generator 58 produces an audio pulse 60 of a standard amplitude and pulse width which is compared with the amplitude of the demodulated received signal 62 at the output of the demodulator 30. The comparator 56 produces an audio output pulse 64 only if the amplitude of the demodulated received signal 62 is less than the amplitude of the standard audio pulse 60. Thus, the standard audio pulse 60 is in effect providing the audio threshold level and when the received signal 62 corresponding to the phasor 20 of the desired metal objects decreases below the amplitude of the standard audio pulse, it produces a comparator output 64 of extremely high amplitude. The comparator output pulses 64 give a positive indication of the detection of the desired metal object and are transmitted through an audio amplifier 66 to a loudspeaker or earphones 68 which produces a sound output indication on a meter 70 after passing through meter amplifier 72 to provide a meter reading indication. The positions of the waveforms in the electrical circuit of FIG. 6. and the system of FIG. 1 are indicated by the reference numerals of the waveforms in such figures.

This comparator operation is clear from the waveforms shown in FIG. 2. Thus, in FIG. 2C, when the received signal is adjusted to the threshold level at point 54 of FIG. 4, the demodulator output 62 is always greater than the audio pulse 60 of FIG. 2D except at the peak value 74. When the peak of the audio pulse 60 exceeds the amplitude of the demodulator output signal 62 at point 74, a comparator output pulse 64 is produced. Under the conditions of FIG. 2C, no metal object or other target is present and the tuning control 34 and the discriminate control 46 have been adjusted to provide the received signal with an amplitude substantially equal to the audio threshold level. Under these conditions the small comparator output pulse 64 of FIG. 2E is produced which causes a low level sound output to the emitted from speaker 68. However, when a metal coin or other highly conductive metal object is detected, represented by phasor 20 at point 54, the demodulator output 62' reduces to substantially zero amplitude as shown in FIG. 2F. As a result, the standard audio phase 60 exceeds the received signal 62 at the demodulator output for a greater portion of the time. This causes a larger amplitude comparator output phase 64' to be produced at the output of the comparator which is initiated at a time corresponding to point 74'. The larger amplitude of the comparator output pulse 64' of FIG. 2H causes a much louder sound at the loudspeaker 68 or a much larger deflection of the meter needle, thereby clearly indicating the presence of the coins or other precious metal objects.

Also shown in time relationship in FIG. 2A and 2B are the audio modulated R. F. oscillator output signal 76 and a corresponding pulse generator signal 78 produced within the audio pulse generator 58 which is wave shaped to form the standard audio pulse 60, in a manner hereafter discussed with respect to the circuit of FIG. 6. It should be noted that the start of the audio pulses 60 corresponds in time to the beginning of the pulse generator 78 and the audio modulated envelope of the R. F. oscillator signal 76. The voltage values given for the waveforms of FIG. 2 corresponds to the values of the signals produced in the electrical circuit shon in FIG. 6.

Figure 6:
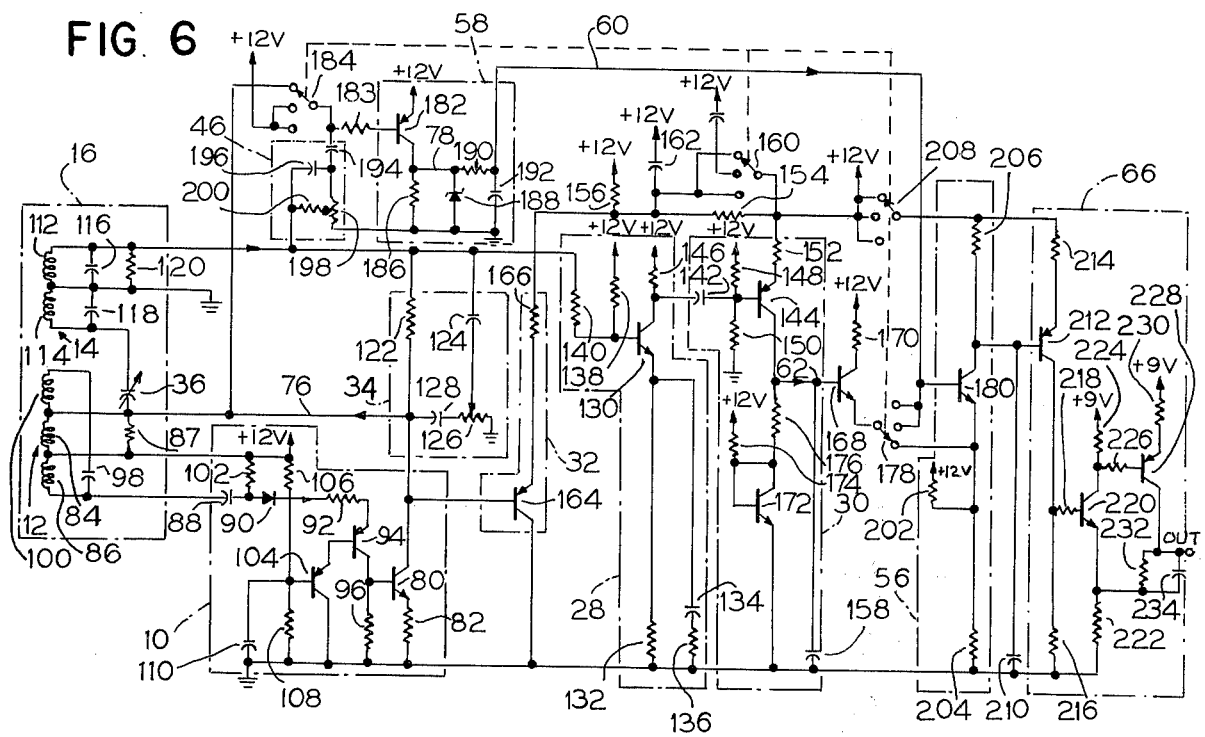
FIG. 6 is an electrical circuit diagram of the metal detector system of FIG. 1.

As shown in FIG. 6, one embodiment of the metal detector of the present invention has an audio modulated R.F. oscillator 10 including an inverter transistor 80 of NPN type having its emitter connected to ground through a bias resistor 82 of 18 ohms and its collector connected to an L C tank circuit formed by the transmit coil 12 and shunt capacitor 98 having an R.F. oscillation frequency of about 100 kilohertz. The transmit coil 12 includes a pair of transmit coil portions 84 and 86 connected in series with a coupling capacitor 88 of 0.01 microfarads, a diode 90 and a coupling resistor 92 of 300 ohms between the collector of transistor 80 and the emitter of a second inverter transistor 94 of PNP type whose collector is connected to the base of transistor 80 to provide positive feedback for oscillation. The collector of transistor 94 is connected to ground through a load resistor 96 of 100 kilohms. The shunt capacitor 98 which may be about 5,000 picofarads, is connected between the lower terminal of coil 86 and the upper terminal of a third transmit coil portion 100. In addition, a shunt resistor 87 of 1.0 kilohms is connected in parallel with coil portion 84. The common terminal of resistor 87 and coil portions 84 and 86 is connected to a +12 volt D.C. supply.

Audio frequency amplitude modulation of the R.F. signal is achieved by capacitor 88 charging sufficiently to render diode 90 non-conducting and temporarily stopping oscillation, at which point the capacitor 88 then discharges through a discharge resistor 102 of 270 kilohms connected to a point between such capacitor and diode, sufficiently to enable the diode to again conduct. This results in the oscillator output signal 76 of FIG. 2A. Note that the R.C. time constant for capacitor 88 and resistor 102 is about 0.0027 second, which corresponds to an audio modulation frequency of about 370 hertz.

A third transistor 104 of PNP type is provided in the oscillator with its emitter connected to the base of transistor 94, its collector grounded and its base connected between a pair of voltage divider resistors 106 and 108 of 75 kilohms and 12 kilohms respectively which are connected between the +12 volt supply and ground. A bypass capacitor 110 of 0.02 microfarads is connected in parallel with resistor 108. This third transistor provides temperature compensation for the other two transistors and maintains the reference voltage on the base of transistor 94 substantially constant.

The receive coil 14 has a grounded center tap to provide first and second coil portions 112 and 114 which are each connected in parallel with one of a pair of capacitors 116 and 118 of 3,000 picofarads. In addition a shunt resistor 120 of 3.9 kilohms is connected in parallel with receive coil portion 112. A trimmer capacitor 36 which varies between 20 and 200 picofarads is connected between the common terminal of transmit coil portions 100 and 84 and the lower terminal of receive coil portion 114.

The tuning control circuit 34 includes a fixed resistor 122 of 330 kilohms connected between the common terminal of transmit coil portions 84 and 100 and the upper terminal of receive coil portion 112. A shunt capacitor 124 of 150 picofarads with 1% tolerance is connected in parallel with resistor 122 through the movable tap of a potentiometer resistance 126 of 850 ohms with 1% tolerance. One terminal of the potentiometer 126 is grounded while its other terminal is connected to a coupling capacitor 128 of 0.033 microfarads with 1% tolerance to the bottom terminal of resistor 122. The capacitors 124 and 128 and potentiometer resistance 126 are selected to transmit a tuning signal from oscillator 10 to the output of the receive coil 14 which is of the same phase as the received signal produced by magnetic mineral soil. As a result of adjustment of the movable tap of potentiometer 126, the amount of the R.F. oscillator signal coupled to the output of the receive coil through capacitors 128 and 124 changes so that it cancels a different amount of the received signal to adjust the amplitude of the received signal to the audio threshold level. It should be noted that when the tap on the potentiometer 126 is set at a midpoint there is no change in the amplitude of the received signal, while movement of the tap to the left or right decreases or increases the amplitude of the received signal along the same phase angles as the received signal produced by magnetic mineral soil. The effect of adjustment of the trimmer capacitor 36 and the tuning control potentiometer 126 is to eliminate any component in the received signal which tends to be produced by ferrous mineral soil in the manner described previously.

The radio frequency amplifier 28 connected to the output of the receive coil 14 includes an inverter amplifier transistor 130 of NPN type whose emitter is connected to ground through a bias resistor 132 of one kilohm which is shunted by a capacitor 134 of 0.02 microfarads in series with a resistor 136 of 470 ohms. The base of transistor 130 is connected to a +12 volt D. C. supply through a bias resistor 138 of 36 kilohms, and is connected through a coupling resistor 140 of 6.2 kilohms to the upper terminal of the receive coil portion 112. The collector of transistor 130 is connected to a +12 volt D.C. supply through a load resistor 146 of 5.6 kilohms. The output of the R.F. amplifier 28 is taken from the collector of transistor 130 and transmitted through a high frequency coupling capacitor 142 of 0.02 microfarads which passes the R.F. frequency signal to the input of demodulator 30.

Demodulator 30 includes a phase inverter transistor 144 of PNP type whose base is connected as the input of such demodulator. The base of transistor 144 is connected between a pair of voltage divider resistors 148 and 150 of 22 kilohms and 390 kilohms respectively which are connected between a +12 volt D.C. supply and ground. The demodulator transistor 144 is normally biased non-conducting and is turned "on" by only the positive going peaks of the R.F. received signal. The emitter of transistor 144 is connected through three voltage divider resistors 152 of 100 ohms, 154 of 27 kilohms, and 156 of 1.5 kilohms to a +12 volt D.C. supply while the collector of transistor 144 is connected to ground through a high frequency bypass filter capacitor 158 of 0.02 microfarads. Bypass filter capacitor 158 shunts the R.F. frequency of the received signal to ground, leaving a demodulated received signal of audio frequency at the output 62 of the demodulator, of a waveform shown in FIG. 2C.

Resistor 154 is short circuited by a switch 160 during the inverse discrimination operation of the metal detector in the discriminate position of the switch shown so that the upper terminal of resistor 152 is connected through such switch to the lower terminal of a storage capacitor 162 of 10 micromicrofarads. This storage capacitor is charged by current pulses flowing from the bias level control circuit 32 including an emitter follower transistor 164 of PNP type. Transistor 164 has its base connected as an input to the collector of the oscillator output transistor 80 while its collector is grounded. The emitter of transistor 164 is connected through a load resistor 166 of 30 ohms to the common terminal of the storage capacitor 162 and resistor 156. As a result, transistor 164 supplies current pulses through resistor 166 to storage capacitor 162, whose amplitudes are adjusted in accordance with the amplitude of the R.F. oscillator signal and charge the storage capacitor to a corresponding D.C. voltage of, for example, one volt. As a result, the lower terminal of capacitor 162 is at a potential of about +11.0 volts which is connected through switch 160 to the upper terminal of resistor 152 to provide the output bias voltage for transistor 144. Thus the value of this output bias voltage to compensate for changes in the amplitude of the oscillator signal, due to aging of the battery powering such oscillator etc. so that the amplitude of the demodulator output signal is not affected.

The output of the demodulator 30 is transmitted through an emitter follower transistor 168 of NPN type whose collector is connected through a resistor 170 of 2 kilohms to a +12 volt D.C. supply. A D.C. reference voltage level is set on the base of the emitter follower transistor 168 at about 0.6 volts, by a NPN type transistor 172 connected as a diode in the demodulator whose base is connected through a resistor 174 of 100 kilohms to a +12 volt D.C. supply. Thus, the emitter of transistor 172 is connected to ground while its base and collector are tied together so that its emitter bias voltage of +0.6 volts is transmitted through another resistor 176 of 22 kilohms to the base of transistor 168. Of course, resistor 176 also functions as the load resistor for the demodulator transistor 144.

The emitter output of the emitter follower transistor 168 is connected through a second switch 178 in the discriminate position shown to one input of the comparator 56 at the emitter of a comparator transistor 180 of NPN type. The base of the comparator transistor 180 is connected as the other input of the comparator to the output of the audio phase generator 58 which supplies the audio pulses 60 to the comparator as discussed above.

The audio pulse generator 58 includes an inverter switching transistor 182 of NPN type whose emitter is connected to a +12 volt D.C. supply and whose base is connected through a coupling resistor 183 of 27 kilohms and then through a third switch 184 in the discriminate position shown to the output 76 of the R.F. oscillator 10. The collector of transistor 182 is connected to ground through a load resistor 186 of 2.4 kilohms which is shunted by a Zener diode 188. As a result, only the negative portion of the oscillator output signal 76 is transmitted through the switching transistor 182 and inverted as the positive polarity pulse generator signal 78 of FIG. 2B whose maximum amplitude is limited by the Zener diode 188. The pulse generator signal 78 is filtered and smoothed by transmitting it through a low pass filter including a coupling resistor 190 of 22 kilohms and a bypass capacitor 192 of 0.02 microfarads connected to ground. This filter bypasses the R.F. frequency signal to ground and reshapes the square wave audio modulation to provide the audio pulse 60 at the output of the pulse generator 58.

The discriminate control 46 includes a pair of capacitors 194 and 196 of 0.02 microfarads and 33 picofarads, respectively, connected in series between the common terminal of the transmit coil portions 84 and 100 and the upper terminal of the receive coil portion 112 through switch 184 in the discriminate position shown. The common terminal of capacitors 194 and 196 is connected to ground through a potentiometer resistance 198 of 5 kilohms. The movable contact of potentiometer 198 is connected through a series resistor 200 of 27 kilohms across the capacitor 196. This discriminate control circuit 46 acts as a variable reactance and applies a portion of the oscillator signal to the receive coil 14 without cancellation of the receive coil signal to introduce a receive coil signal component that is 90° out of phase with the component introduced by the tuning control circuit 34 and therefore in conjunction with the tuning control circuit, acts to move the operating point between above zero and −90° for inverse discrimination as discussed above. Operating points nearest to −90° allow only a few of the highest conductivity metal objects to produce a positive detector output.

Returning now to the comparator 56, transistor 180 has its emitter connected to a point between a pair of voltage divider resistors 202 and 204 of 100 kilohms and one kilohm respectively, which are connected between a +12 volt D.C. supply and ground. The collector of the comparator transistor 180 is connected to a +12 volt D.C. supply through a load resistor 206 of 6.2 kilohms and a fourth switch 208 in the discriminate position of such switch shown. It should be noted that in the other positions of the four switches 160, 178, 184, and 208, the metal detector circuit of FIG. 6 does not operate in the inverse discrimination mode of the invention and for this reason its other modes of operation in the other switch positions will not be described.

The output of the comparator transistor 180 is the negative going audio frequency comparator output pulses 64 shown in FIGS. 2E and 2H whose amplitudes are determined by the difference in the amplitude between the standard audio pulses 60 and the demodulated received signal 62, as described previously with respect to FIG. 2. Thus, the comparator transistor 180 operates as a switch which is rendered conducting by the standard audio pulses 60 when they exceed the amplitude of the demodulated received signal 62. In this regard, it should be noted that the 0.6 volt drop across the emitter junction of the comparator transistor 180 is matched by a similar drop of opposite polarity across the emitter junction of the emitter follower transistor 168 so that the voltage level of the demodulator output signal 62 can be compared directly with the voltage level of the audio pulse 60 as is done in FIGS. 2C and 2D or FIGS. 2F and 2G to determine the start of the comparator output signal 64.

A bypass capacitor 210 of 0.005 microfarads is connected between the collector of comparator transistor 180 and ground, in order to bypass any remaining R.F. signal which might be transmitted through such transistor.

The collector of the comparator transistor 180 is connected to the input of the audio amplifier 66 at the base of another phase inverter transistor 212 of PNP type. The emitter of transistor 212 is connected through a bias resistor 214 of 300 ohms to a +12 volt D.C. supply, while its collector is connected to ground through a load resistor 216 of 1.5 kilohms. The output from the collector of inverter transistor 212 is connected through a coupling resistor 218 of 1.5 kilohms to the base of a second inverter transistor 220 of NPN type. The emitter of transistor 220 is connected to ground through a bias resistor 222 of 22 ohms while its collector is connected to a +9 volt D.C. supply through a load resistor 224 of 10 kilohms. The output of transistor 220 is transmitted from its collector through a coupling resistor 226 of 390 ohms to the base of a third inverter transistor 228 of PNP type. Transistor 228 has its emitter connected to a +9 volt D.C. supply through a bias resistor 230 of 3.9 ohms and its collector connected to ground through a load resistor 232 of 300 ohms which is in series with resistor 222. Bypass capacitor 234 of 0.005 microfarads is connected in parallel with resistor 232. The output of the audio amplifier is taken from the collector of transistor 228 and transmitted to the meter amplifier 72 or to the loudspeaker 68 of FIG. 1 as described above.

Figure 7:
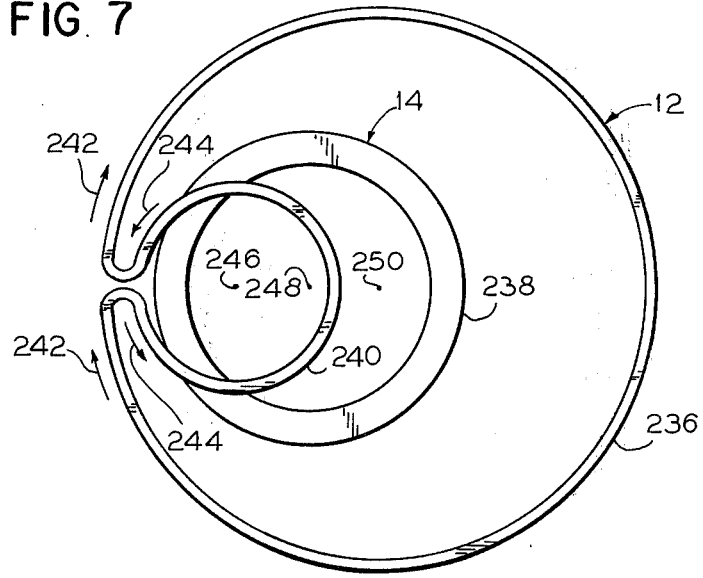
FIG. 7 is a plan elevation view of one embodiment of transmit and receive coils suitable for use in the metal detector of the present invention.

One embodiment of transmit and receive coils suitable for use with the inverse discrimination metal detector of the present invention is shown in FIG. 7. The transmit coil 12 is in the form of a first annular loop 236 which surrounds receive coil 14 in the form of a second annular loop 238 of smaller diameter than the first loop. Each of the turns of the transmit coil 12 includes a re-entrant portion forming a third annular loop 240 extending within the first loop 236 and eccentric with the first and second loops. The loop 240 provides a negative feedback coil since current flowing through loop 236 in the clockwise direction of arrows 242, flows through the feedback coil 240 in the counter clockwise direction of arrows 244 which is opposite to direction 242. As a result, the induced magnetic field produced by the feedback coil 240 and the transmit coil 236 tend to balance and produce no resultant current flow in the receive coil 238 in air when no metal object or other target is present. Of course, when a metal object or other target is present near the coils, it causes an unbalance so that a receive current is induced in the receive coil whose amplitude and phase are proportional to the type of metal object present. It should be noted that the feedback coil 240 has a center 246 which is eccentric with the center 248 of the receive coil 238 even though the feedback coil overlies such receive coil. Also, the center 248 of the receive coil 238 is positioned between the center 250 of the transmit coil 236 and the center 246 of the feedback coil 240. The coil configuration shown in FIG. 7 is known to result in superior discrimination capability, particularly between nickel coins and bottle caps when compared with many other coil configurations. In one preferred embodiment, a transmit coil 236 is in the form of an annular loop of number 27 coated copper wire about 7¼ inches in diameter. The receive coil 238 is in the form of an annular loop of number 31 coated copper wire having an average diameter of about 4 inches and the feedback coil 240 is in the form of an annular loop of number 27 coated copper wire having a diameter of about 2 ¾ inches. The transmit coil 236 includes coil portions 84, 86 and 100 of FIG. 6 which are of 5 turns, 15 turns, and 10 turns, respectively, while the feedback coil is of 30 turns. The receive coil portions 112 and 114 are each of 42 turns.

It will be obvious to one having ordinary skill in the art that many changes may be made in the above described preferred embodiment of the invention without departing from the spirit of the invention. For example, other types of coils can be used than that shown in FIG. 7. Of course, the received signal could be amplified before being combined with the tuning control signal and the discriminate control signal to achieve correct phase and amplitude for discrimination. Also, the R.F. oscillator signal need not be audio modulate but a separate audio oscillator could be used in the received signal path which is modulated by a changing D.C. voltage corresponding to the demodulated received signal. In this case the audio pulse generator 58 and comparator 56 would be eliminated and the positive indication of the detection of coins by an audio output signal achieved by applying the D.C. voltage received signal to a transistor in the added audio oscillator which increases its output signal amplitude in response to decreases in the D.C. received signal. Operating points having positive phase angles between +90° and +180° can be used if inverse discrimination is not elected. Also, other means for achieving threshold audio level and other means to achieve correct residual signal phase for discrimination can be used although any other tuning means will not correct the phase errors caused by mineral soil and accuracy of discrimination will be impaired. Therefore, the scope of the present invention should only be determined by the following claims.

I claim:

1. An induction balance metal detector apparatus in which the improvement comprises:

search head means including transmit coil means for producing an electromagnetic field in response to an electrical input signal, and receive coil means for producing received signals at the output of the receive coil means in response to the presence of metal objects in said field;

discriminator means for applying one portion of said input signal to the receive coil as a first component of the received signal without cancellation of the received signal, to set the quiescent operating point of the metal detector and to change the phase of the received signal to amplitude discriminate between received signals produced by different types of metal objects which have phase angles between about −90° and −180° with respect to the received signal produced by magnetic mineral soil and for producing a detector output signal corresponding to certain predetermined types of said metal objects; and indicator means for indicating when said detector output signal is produced.

2. Metal detector apparatus in accordance with claim 1 which also includes tuning means for applying another portion of the input signal to the receive coil as a second component of the received signal which is out of phase with said first component, to adjust the amplitude of the residual received signal produced by the receive coil when no metal object is present, until it is at a threshold level on opposite sides of which the indicator means will produce an output indication and no output indication.

3. Metal detector apparatus in accordance with claim 1 in which the discriminator means includes an adjustment means for adjusting the portion of the input signal applied to the receive coil to change the phase of the residual receive signal produced by the receive coil when no metal object is present, to an operating point having a phase angle between about zero −90° with respect to the component of the received signal produced by the receive coil in response to the presence of magnetic mineral soil.

4. Metal detector apparatus in accordance with claim 1 in which the input signal is a radio frequency signal amplitude modulated with an audio signal.

5. Metal detector apparatus in accordance with claim 3 in which the adjustment means of the discriminator means selects the operating point so that the presence of a highly conductive nonmagnetic metal object reduces the amplitude of the receive coil output signal below said threshold level while the presence of other types of metal objects increase the amplitude of the receive coil signal above said threshold level to provide inverse discrimination.

6. Metal detector apparatus in accordance with claim 5 in which the indicator means includes means for producing a positive indication output signal when the received signal is below said threshold and no output signal when the received signal is above said threshold.

7. Metal detector apparatus in accordance with claim 2 in which the tuning means adjusts the amplitude of the residual signal along the same phase angle as the component of the receive coil signal produced by the presence of magnetic mineral soil to eliminate the effect of said mineral soil.

8. Metal detector apparatus in accordance with claim 1 in which the indicator means produces an audible signal corresponding to the detector output signal.

9. A metal detector apparatus in accordance with claim 1 in which the transmit coil means includes a first annular loop, the receive coil means includes a second annular loop of smaller size than said first loop surrounded by said first loop but not coaxial with said first loop, and a negative feedback coil in the form of a third annular loop of smaller size than said second loop, and partially overlying said second loop and surrounded by said first loop, said feedback coil connected to said transmit coil so that signal current flows in opposite directions through said transmit coil and said feedback coil.

10. Metal detector apparatus in accordance with claim 9 in which the third loop is eccentric with the first and second loops, and the center of the second loop is positioned between the centers of the first and third loops.

11. An induction balance metal detector circuit in which the improvement comprises:

search head means including transmit coil means for producing an electromagnetic field when an oscillator signal is applied thereto and receive coil means for producing received output signals in response to the presence of metal objects in said field;

means for setting the operating point of the detector at a threshold level on one side of which the received signal produces no detector output signal and on the other side of which the received signal produces a detector output signal; and inverse discriminator means for applying one portion of said oscillator signal to the receive coil as a first component of the received signal without cancellation of the received signal, to change the phase of the received signals to amplitude discriminate between different types of metal objects, said discriminator means including an adjustment means for changing the phase angle of said operating point to an angle between about zero and −90° relative to the component of the received signal produced by the receive coil in response to the presence of magnetic mineral soil for inverse discrimination so that high conductive nonmagnetic metal objects reduce the received signal below said threshold level and other metal objects increase the received signal above said threshold.

12. Metal detector apparatus in accordance with claim 11 in which the transmit coil means is connected to an oscillator producing an audio modulated radio frequency input signal, and which also includes audio pulse generator means for producing audio frequency pulses of standard amplitude which are synchronized to audio modulations of said input signal, and comparator means for comparing the amplitudes of said audio pulses with those of demodulated receive coil signals to produce a comparator output signal when the audio pulses exceed the amplitude of the demodulated receive coil signals, said comparator output signal providing a detector output signal of audio frequency.

13. Metal detector apparatus in accordance with claim 11 which also includes tuning means for applying another portion of the oscillator signal to said receive coil to produce a second component of the received signal which is 90° out of phase with the first component, to adjust the amplitude of the residual signal produced by the receive coil when no metal object is present, along the same phase angle as the component of the receive coil signal produced by the presence of magnetic mineral soil.

14. Metal detector apparatus in accordance with claim 11 in which the discriminator means includes a capacitor and a variable resistance in parallel with said compacitor which are connected between the transmit coil and the receive coil.

15. Metal detector apparatus in accordance with claim 13 in which the tuning means is a tuning circuit including a resistor in parallel with the series connection of a capacitance and a variable resistance, such tuning circuit being connected between the transmit coil and the receive coil.

* * * * *

UNITED STATES PATENT OFFICE
CERTIFICATE OF CORRECTION

PATENT NO. : 4,024,468
DATED : May 17, 1977
INVENTOR(S) : RICHARD EDWARD HIRSCHI

It is certified that error appears in the above-identified patent and that said Letters Patent are hereby corrected as shown below:

Col. 3, line 44, "conducted" should be --connected--.

Col. 4, line 13, "negativity" should be --negative--.

Col. 5, line 46, before "point" insert --operating--.

Col. 7, line 4, "the" should be --be--.

Col. 7, line 9, "phase" should be --pulse--.

Col. 7, line 12, "phase" should be --pulse--.

Col. 7, line 23, "pulse" should be --pulses--.

Col. 7, line 27, after "generator" insert --signal--.

Col. 7, line 29, "corresponds" should be --correspond--.

Col. 7, line 31, "shon" should be --shown--.

Col. 8, line 15, "3,000" should be --3,300--.

Col. 9, line 46, after "voltage" insert --varies--.

Col. 10, line 4, "phase" should be --pulse--.

Col. 10, line 8, "NPN" should be --PNP--.

Col. 10, line 46, "above" should be --about--.

Col. 12, line 33, "modulate" should be --modulated--.

UNITED STATES PATENT OFFICE
CERTIFICATE OF CORRECTION

Patent No. 4,024,468   Dated May 17, 1977

Inventor(s) Richard Edward Hirschi

It is certified that error appears in the above-identified patent and that said Letters Patent are hereby corrected as shown below:

Column 13, line 26, after "zero" insert -- and --.

Signed and Sealed this twenty-third Day of August 1977

[SEAL]

Attest:

RUTH C. MASON
*Attesting Officer*

C. MARSHALL DANN
*Commissioner of Patents and Trademarks*